United States Patent [19]

Masunaga et al.

[11] Patent Number: 4,951,277
[45] Date of Patent: Aug. 21, 1990

[54] OPTICAL DISK PLAYER

[75] Inventors: Yoshifumi Masunaga; Yoshitaka Simoda, both of Saitama, Japan

[73] Assignee: Pioneer Electronic Corporation, Tokyo, Japan

[21] Appl. No.: 312,985

[22] Filed: Feb. 21, 1989

[30] Foreign Application Priority Data

Aug. 31, 1988 [JP] Japan ................................ 63-215107

[51] Int. Cl.⁵ ............................................. G11B 25/04
[52] U.S. Cl. ..................................... 369/270; 369/271; 369/290
[58] Field of Search .................. 335/301, 302; 369/43, 369/44, 270

[56] References Cited

U.S. PATENT DOCUMENTS

| 4,746,791 | 5/1988 | Forkel | 250/231 |
| 4,802,158 | 1/1989 | Ogusu | 369/270 |
| 4,829,501 | 5/1989 | Seto et al. | 369/270 |

Primary Examiner—Stuart S. Levy
Assistant Examiner—Kenneth B. Wells
Attorney, Agent, or Firm—Sughrue, Mion, Zinn, Macpeak & Seas

[57] ABSTRACT

In an optical disk player, the disk clamper magnet is so constructed as to prevent the resonance of the pickup actuator as the pickup approaches the inner circumference of the disk due to interaction between the clamper maagnet and actuator magnets as the clamper magnet rotates. This structure avoids the resonance problem which is especially prevalent when a pickup approaches an inner disk circumference during playing. Therefore, it is possible to prevent an increase in rate of occurrence of tracking errors or the like which hinder reproducing capability or even make the tracking servo inoperative in an extreme case.

8 Claims, 3 Drawing Sheets

APPREHENSIVE FREQUENCY REGIONS BY ALTERNATING MAGNETIC FIELD

APPREHENSIVE FREQUENCY REGIONS BY ALTERNATING MAGNETIC FIELD

OPTICAL DISK PLAYER

BACKGROUND OF THE INVENTION

The present invention relates to a disk player for reproducing, by means of an optical pickup, information from a disk such as a video disk, a compact disk, or the like, carrying an audio signal and a video signal recorded thereon.

The optical pickups used in optical disk players of the type as described above include an MM-type (moving magnet type) optical pickup, shown in FIG. 6, and an MC-type (moving coil type) optical pickup, shown in FIG. 7. The MC-type optical pickup presently is used more often.

In the MC-type optical pickup as shown in FIG. 7, coils 4 are attached to a movable portion 2 of an actuator having an objective lens 1. The movable portion 2 is driven in the focusing direction, in the tracking direction, etc., by forces generated between the coils 4 and magnets 3 provided outside the coils 4.

In the MM-type optical pickup as shown in FIG. 6, on the other hand, magnets 3 are attached to an outer periphery of a movable portion 2 of an actuator having an objective lens 1, and coils 4 for performing tracking and focusing are positioned at the outside of the magnets 3. A tracking control current and a focusing control current are made to flow into the coils 4 to drive the movable portion 2 of the actuator in the focusing direction (in the direction of the optical axis of the objective lens), in the tracking direction (in the direction perpendicular to the optical axis of the objective lens), etc. by forces generated between the coils 4 and the magnets 3.

In one example of a disk clamping apparatus for clamping a disk onto a turntable, a magnet is attached to the turntable, and a magnet plate such as an iron plate or the like is attached to a clamper for pressing a disk against the turntable. In another example, the magnet plate is attached to the turntable and the magnet is attached to the clamper. Such a disk clamping apparatus is arranged to clamp a disk between the clamper and the turntable by the force of attraction between the magnet and the magnetic plate, the clamper rotating as the disk rotates.

Generally, the magnet 5 used in the disk clamping apparatus is two-pole magnetized (hereinafter, the term "two-pole magnetization" means that there are two magnetized poles in both of the front and rear surfaces of the magnet) as shown in FIG. 8(b), so that a magnetic field is generated toward the magnetic plate to attract it to the magnet through a disk. As a result, even after the magnetic plate has been attracted to the magnet, a leakage field is generated from the magnet 5 in the form of an alternating field, because of the rotation of the clamper.

If an MM-type optical pickup is used in a optical disk player using such a disk clamping apparatus as described above, at the time of reproducing recorded information located at an inner circumferential portion of a disk, the magnet 3 attached on the movable portion 2 of the actuator comes closer to the clamper and to the turntable disposed at the central portion of the disk, so that the actuator movable portion 2 is affected by attractive/repulsive forces due to the alternating field of the magnet 5 of the disk clamping apparatus (FIG. 8(a)). Such an influence appears as a force acting on the actuator movable portion 2 mainly in the tracking direction.

Moreover, the vibrations of the movable portion 2 of the actuator generated by the alternating field are made larger because of the frequency of the alternating field. That is, the rotating speed of a spindle motor or the frequency of the alternating field generated by the magnet 5 of the turntable, and the resonance frequency of the movable portion 2 of the actuator are of similar value. As a result, an error rate of a tracking error or the like is increased, reducing the reproducing capability of the optical disk player, or making the optical disk player reproduce so defectively as to be out of range of operation of a tracking servo, so that the servo cannot operate.

The resonance of the actuator movable portion now will be discussed in greater detail. When reproducing a compact disk, for example, the linear velocity V of the disk is determined to be 1.2–1.4 m/sec. Program index information (TOC) is recorded within a range of from $r=23$ mm to $r=25$ mm, where r is a radius from the center of the disk. It is known experimentally that the position where the influence of attraction/repulsion due to the magnet 5 of the turntable on the actuator movable portion 2 is substantially negligible is a position where $r=28.5$ mm. Therefore, the actuator position range of interest is from $r=23.0$ mm to $r=28.5$ mm.

The rotating speed of the motor (the magnet 5 attached to the turntable) in the foregoing range when the linear velocity of the disk is worst is as follows:

$f=1400/2\pi r=9.7$ Hz when $r=23.0$ mm $f=1200/2\pi r=6.7$ Hz when $r=28.5$ mm

Therefore, the rotating frequency (the frequency of the alternating field) of the magnet 5 ranges from 6.7 Hz to 9.7 Hz.

Generally, the magnet has a magnetization pattern in the form of a substantially rectangular wave, that is, the magnet is magnetized by rectangular wave magnetization. Therefore, if the magnet is rotated, frequency components other than a fundamental frequency are generated. Accordingly, a rectangular wave f(t) may be expressed as follows:

$$f(t) = 4k/\pi(\sin t + \tfrac{1}{3}\cdot\sin 3t + 1/5\cdot\sin 5t + \ldots) \quad (1)$$

FIG. 4 shows the spectra of the third and fifth harmonics of the fundamental wave having a frequency of 7.5 Hz. In the drawing, k represents the degree of amplitude. Thus, the third, fifth, . . . . harmonics are generated in addition to the fundamental sine wave, but the level of those higher odd order harmonics become smaller as the order becomes higher. Thus, for example, the respective levels of the third and fifth harmonics are $\tfrac{1}{3}$ and 1/5 as large as that of the fundamental sine wave. Only the third harmonic affects the magnetic field in addition to the fundamental wave; the influence of the fifth and higher order harmonics are substantially negligible in practical use.

Then, considering the magnet 5 (two-pole magnetization) of the turntable, it is understood that an additional region of concern exists in the frequency region of from $f=20.1$ Hz to $f=29.1$ Hz of the third harmonic in addition to in the frequency region of from $f=6.7$ Hz to $f=9.7$ Hz of the fundamental wave (FIG. 5(a)).

Therefore, there has been a problem in that if the low band resonance frequency $f_0$ of the actuator coincides with frequency of attraction/repulsion by the magnet 5, the vibrations of the movable portion of the actuator are amplified so that reduction in reproducing capability of defective reproduction is caused in the optical disk player as described above.

SUMMARY OF THE INVENTION

In view of the foregoing, it is an object of the present invention to provide an optical disk player in which the resonance frequency of a movable portion of an actuator is made so as not to coincide with the frequency of an alternating field generated by a magnet of a turntable. As a result, disk player operation can stay within a range of operation of tracking and focusing servos, keeping those servos operative so as not to lower or even take away the reproducing capability.

In order to attain the foregoing object, according to the present invention, the optical disk player is arranged so that resonance of a magnet of a pickup is not caused by a clamper magnet as this magnet rotates in the condition where the pickup approaches an inner circumference of a disk.

DETAILED DESCRIPTION OF A PREFERRED EMBODIMENT

Figure 1:
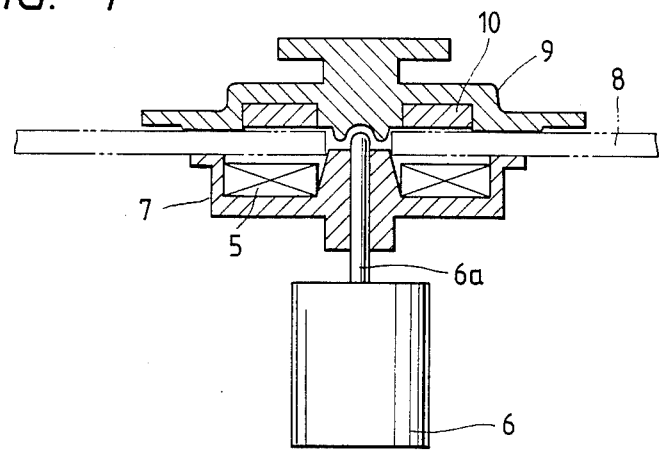
FIG. 1 is a sectional view showing the clamper portion of a turntable.
Figure 2:
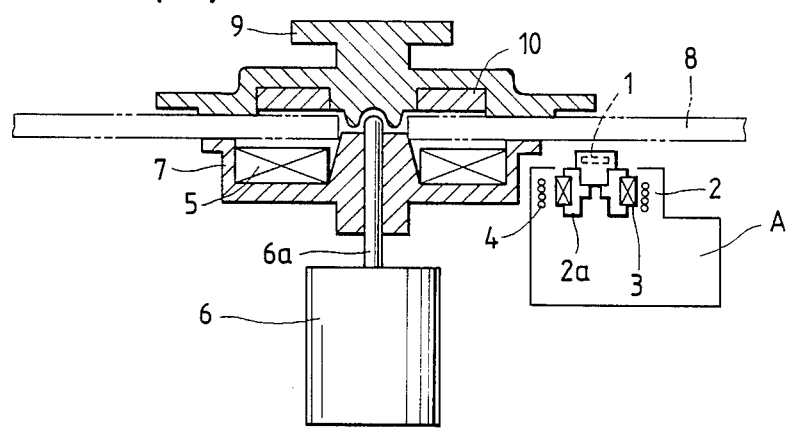
FIG. 2(a) is a sectional view showing the relation between the clamper portion and the pickup.
FIG. 2(b) is a perspective view showing the magnetized state of the magnet.
Figure 2:
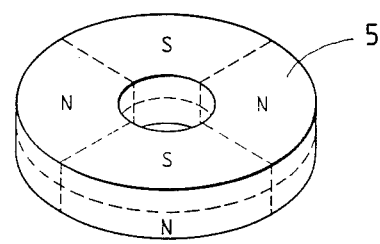
Figure 3:
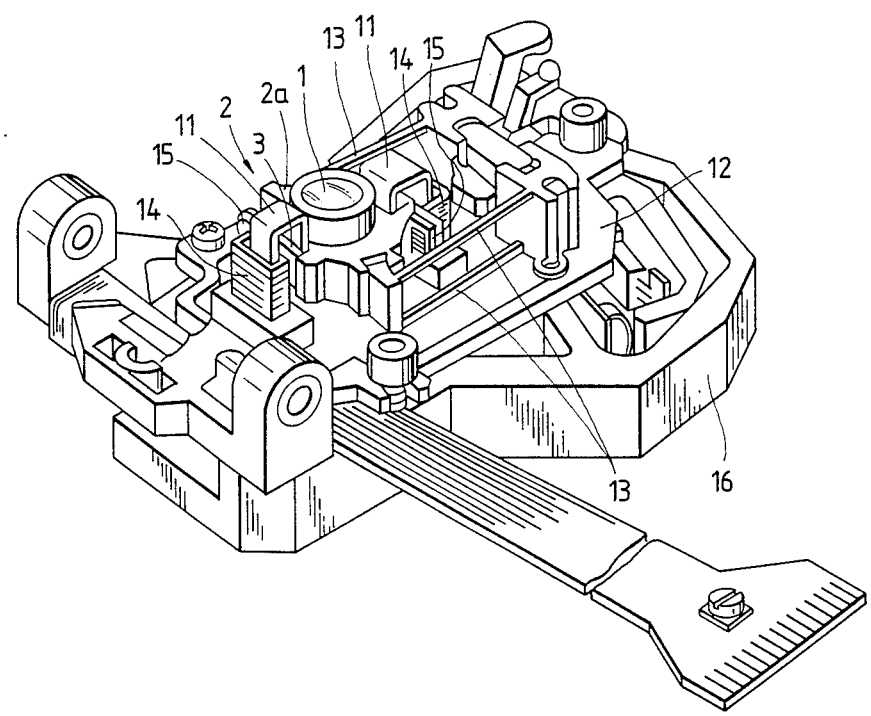
FIG. 3 is a perspective view showing the pickup.
Figure 4:
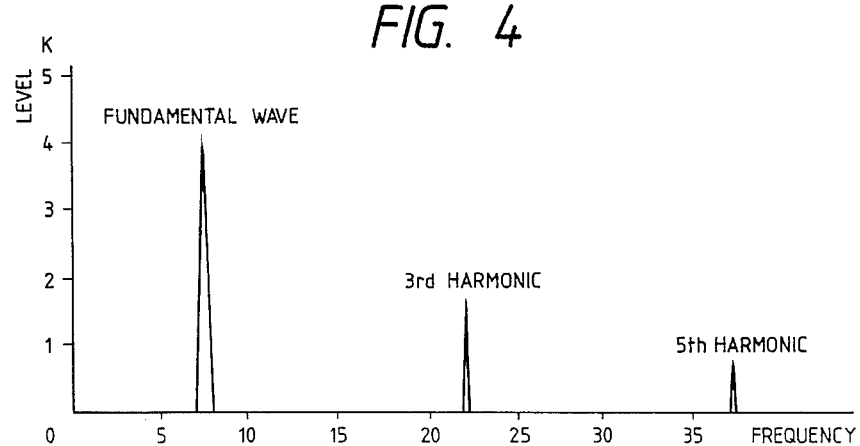
FIG. 4 is a view showing spectra of the alternating field of the magnet.

An embodiment of the present invention now will be described with reference to FIGS. 1 through 3. In FIGS. 1 and 2(a), a ring-like magnet 5 is buried in a turntable 7 so as to be partly exposed at the surface of the turntable 7. The turntable 7 is fixedly mounted on a shaft 6a of a spindle motor 6. In a clamper 9 for clamping a disk 8 onto the turntable 7, an iron plate 10 is buried in a turntable 7 so as to be partly exposed at a lower surface of the clamper 9. The magnet 5 has been magnetized so as to be divided into four poles, as shown in FIG. 2(b).

In the optical pickup used in this embodiment, an MM-type actuator is utilized. The MM-type pickup is arranged so that a pair of magnets 3 are fixed to outer peripheral portions of a holding member 2a for holding an objective lens 1. Coils 4 are disposed at outer peripheral portions of the magnets 3 (towards body of the pickup A), as shown in FIG. 2(a).

The pickup A now will be described in detail with reference to FIG. 3. A pair of U-shaped yokes 11 are attached on opposite surfaces of the holding member 2a holding the objective lens 1, and the magnets 3 are fixed to the inner surfaces of the yokes 11 on the side of the holding member 2a. The holding member 2a is fixed to top ends of suspensions 13, respective ends of the suspensions 13 being fixed to an actuator base 12.

Focusing coils 14 in which the yokes 11 are to be partly inserted are attached to the actuator base 12, and tracking coils 15 are attached to the focusing coils 14.

In the just-described pickup A, the holding member 2a is displaced in a focusing direction by means of the focusing coils 14 and the yokes 11 when a current is made to flow into the focusing coils 14. The holding member 2a is displaced in a tracking direction by means of the tracking coils 15 and the magnets 3 when a current is made to flow into the tracking coils 15. The actuator base 12 is attached to a pickup body 16 so as to be adjustable in the tangential and radial directions.

Now, when the low band resonance frequency $f_0$ of the actuator is within one of the above-described ranges of 6.7 Hz to 9.7 Hz or 20.1 Hz to 29.1 Hz, a method of 4-pole magnetizing the magnet 5 of the turntable 7 may be used as one way of preventing resonance of a movable portion 2 of the actuator when the pickup A comes close to the radial range of r=23.0 mm to 28.5 mm of the compact disk 8, as described above. That is, if the magnet 5 is 4-pole magnetized, attraction and repulsion are repeated twice, not once per revolution of the turntable 7, so that the rotating frequency of the turntable 7 becomes as follows in accordance with the foregoing expression (1).

Fundamental wave: f=13.4–19.4 (Hz)

Third harmonic: f=40.2–58.2 (Hz)

Figure 5A:
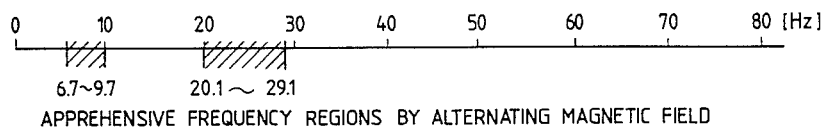
FIGS. 5(a) and 5(b) are frequency characteristic views showing the frequency regions of concern for the magnet.
Figure 5B:
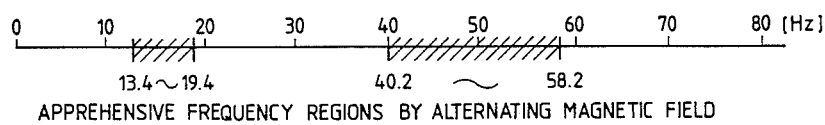
Figure 6:
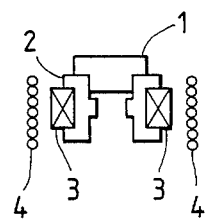
FIG. 6 is a schematic view showing a conventional MM-type optical pickup.
Figure 7:
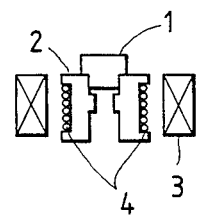
FIG. 7 is a schematic view showing a conventional MC-type optical pickup.
Figure 8A:
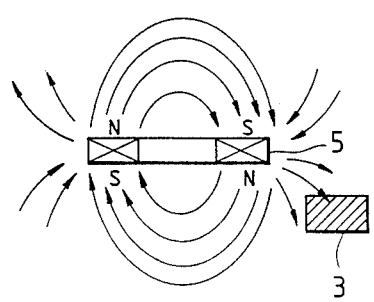
FIG. 8(a) is a view for explaining a state of the leakage flux of the magnet.
Figure 8B:
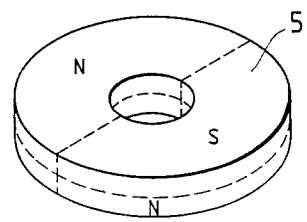
FIG. 8(b) is a perspective view showing a magnetized state of the magnet.

Thus, the rotating frequency of the turntable 7 avoids the frequency regions of 6.7–9.7 Hz and of 20.1–29.1 Hz which define the foregoing frequency regions of concern in the radial range r=23.0 mm to 28.5 mm (FIG. 5(b)), so that the movable portion 2 of the actuator does not resonate. Therefore, if the number of magnetized poles of the magnet 5 is suitably changed, the pickup A is hardly affected, even when it approaches an inner circumference of the disk.

In the foregoing embodiment, the magnet 5 has been magnetized with a rectangular wave, so that the resonance of the movable portion 2 of the actuator is caused both by the fundamental wave component and by other wave components. Accordingly, it also is possible to prevent the resonance of the movable portion 2 of the actuator if the magnet 5 is magnetized with a sine wave including only the fundamental wave component.

The case in which resonating of the movable portion 2 of the actuator is prevented by changing the number of magnetic poles of the magnet 5 has been described. The design also may be carried out so as to obtain a low band resonance frequency $f_0$ of the actuator which can avoid the foregoing resonant points by suitably changing the quality and/or shape of the suspensions 13 supporting the movable portion 2 of the actuator of FIG. 3 on the actuator base 12, or by changing the quality and/or shape of an insulator of a servo mechanism supporting the pickup body 16, and so on.

Although the case has been described in which the magnet 5 is attached to the turntable 7 in the foregoing embodiment, the magnet 5 may be attached to the clamper 9.

Further, although a compact disk has been described by way of example in the foregoing embodiment, the present invention also can be applied to a disk such as an optical video disk from which information is optically read in a non-contact state.

As described above, in an optical disk player according to the present invention, the magnet of the pickup is not caused to resonate by the magnet provided at the clamper as the magnet at the clamper rotates in the condition where the pickup approaches the inner circumference of the disk. Therefore, it is possible to prevent an increase in the error rate of the tracking errors or the like Which make the reproducing capability low or even make the tracking servo inoperative in an extreme case.

We claim:

1. An optical disk player comprising:
    a turntable rotatable for carrying a disk having information recorded thereon;
    an optical pickup for reading the recorded information from said disk;
    a clamper, cooperating with said turntable, for holding said disk on said turntable;
    a magnet disposed on one of said turntable and said clamper and having a number of magnetized poles;
    a magnetic material disposed on the other of said turntable and said clamper,
    said optical pickup including an objective lens, a magnetic circuit, a holding member for holding said objective lens, and an actuator for providing a control current to a coil disposed in said magnetic circuit so as to drive said holding member, said clamper providing a clamping force by means of an attracting force generated between said magnet and said magnetic material,
    wherein said holding member has a natural vibration frequency so as to prevent said holding member from vibrationally resonating with respect to an alternating field generated by said magnet when said pickup approaches an inner circumference of said disk.

2. An optical disk player according to claim 1, wherein the number of magnetized poled in said magnet is altered so that the natural vibration frequency of said holding member and a frequency of said alternating field generated by said magnet do not coincide.

3. An optical disk player according to claim 2, wherein said number of magnetized poles in said magnet is increased.

4. An optical disk player according to claim 2, wherein said number of magnetized poles in said magnet is decreased.

5. An optical disk player according to claim 1, wherein said number of magnetized poles in said magnet is four.

6. An optical disk player according to claim 1, wherein said magnet is attached to said turntable, and said magnetic material is attached to said clamper.

7. An optical disk player according to claim 1, wherein said alternating field includes a fundamental wave having a frequency which is changed so that the natural vibration frequency of said holding member and the frequency of said alternating field generated by said magnet do not coincide.

8. An optical disk player comprising:
    a turntable rotatable for carrying a disk having information recorded thereon;
    an optical pickup for reading the recorded information from said disk;
    a clamper, cooperating with said turntable, for holding said disk on said turntable;
    a magnet disposed on one of said turntable and said clamper and having a number of magnetized poles;
    a magnetic material disposed on the other of said turntable and said clamper,
    said optical pickup including an objective lens, a magnetic circuit, a holding member for holding said objective lens, and an actuator for providing a control current to a coil disposed in said magnetic circuit so as to drive said holding member, said clamper providing a clamping force by means of an attracting force generated between said magnet and said magnetic material,
    wherein said holding member has a natural vibration frequency so as to prevent said holding member from vibrationally resonating with respect to an alternating filed generated by said magnet when said pickup approaches an inner circumference of said disk,
    wherein said alternating filed includes a fundamental wave having a frequency which is changed so that the natural vibration frequency of said holding member and the frequency of said alternating field generated by said magnet do not coincide, and
    wherein said frequency of said fundamental wave is doubled.

* * * * *